(12) United States Patent
Bandel (10) Patent No.: US 11,043,799 B2
(45) Date of Patent: Jun. 22, 2021

(54) DUAL MODE PHASE-TO-PHASE SURGE PROTECTIVE DEVICES

(71) Applicant: Hubbell Incorporated, Shelton, CT (US)

(72) Inventor: Michael William Bandel, North Aurora, IL (US)

(73) Assignee: HUBBELL INCORPORATED, Shelton, CT (US)

(*) Notice: Subject to any disclaimer, the term of this patent is extended or adjusted under 35 U.S.C. 154(b) by 107 days.

(21) Appl. No.: 16/231,792

(22) Filed: Dec. 24, 2018

(65) Prior Publication Data

US 2019/0157855 A1 May 23, 2019

Related U.S. Application Data

(63) Continuation of application No. 15/148,095, filed on May 6, 2016, now abandoned.

(60) Provisional application No. 62/157,907, filed on May 6, 2015.

(51) Int. Cl.
*H02H 3/04* (2006.01)
*H02H 3/22* (2006.01)
*H02H 9/04* (2006.01)
*G08B 21/18* (2006.01)
*H01C 7/12* (2006.01)

(52) U.S. Cl.
CPC ............... *H02H 3/04* (2013.01); *H02H 3/22* (2013.01); *H02H 9/042* (2013.01); *G08B 21/185* (2013.01); *H01C 7/12* (2013.01)

(58) Field of Classification Search
CPC ........ G08B 21/185; H02H 3/04; H02H 3/044; H02H 3/046; H02H 9/041; H02H 9/042; H02H 9/06
See application file for complete search history.

(56) References Cited

U.S. PATENT DOCUMENTS

| 4,739,436 | A | * | 4/1988 | Stefani | H02H 9/042 361/104 |
| 4,922,366 | A | * | 5/1990 | Van Dick | H01H 85/44 337/290 |
| 5,032,946 | A | | 7/1991 | Misencik et al. | |
| 5,761,021 | A | | 6/1998 | Yu | |

(Continued)

FOREIGN PATENT DOCUMENTS

WO    WO-2012024014 A1 * 2/2012 ............... H02H 9/04

OTHER PUBLICATIONS

PCT International Search Report and Written Opinion dated Aug. 12, 2016 from corresponding Application No. PCT/US16/31131, 14 pages.

(Continued)

*Primary Examiner* — Jared Fureman
*Assistant Examiner* — Nicolas Bellido
(74) *Attorney, Agent, or Firm* — Dilworth IP, LLC (57) ABSTRACT

A surge protector having a first hot line, a first load line, a second hot line, a second load line, and a ground line, the surge protector including a first fuse coupled between the first hot line and the first load line; a second fuse coupled between the second hot line and the second load line; a differential mode protection circuit coupled between the first hot line and the second hot line; and a common mode protection circuit coupled to the first hot line, the second hot line and the ground line.

17 Claims, 11 Drawing Sheets

(56) References Cited

U.S. PATENT DOCUMENTS

| | | | | |
|---|---|---|---|---|
| 5,914,845 A * | 6/1999 | Chase | ............... | H02H 9/042 |
| | | | | 361/111 |
| 6,282,075 B1 * | 8/2001 | Chaudhry | ............ | H02H 9/042 |
| | | | | 361/111 |
| 6,388,852 B1 | 5/2002 | Bobash | | |
| 6,829,129 B2 * | 12/2004 | Marsh | ............... | H02H 9/042 |
| | | | | 361/111 |
| 8,284,536 B2 * | 10/2012 | Minarczyk | ......... | H05B 41/292 |
| | | | | 361/118 |
| 8,937,441 B1 | 1/2015 | Taylor et al. | | |
| 9,748,764 B2 * | 8/2017 | Bandel | ............... | H02H 9/06 |
| 2003/0227733 A1 | 12/2003 | Marsh et al. | | |
| 2005/0122655 A1 * | 6/2005 | Hotchkiss | ............ | H02H 9/044 |
| | | | | 361/103 |
| 2005/0152085 A1 | 7/2005 | Skinner | | |
| 2006/0139832 A1 | 6/2006 | Yates et al. | | |
| 2010/0127625 A1 | 5/2010 | Minarczyk et al. | | |
| 2013/0093595 A1 | 4/2013 | Lee et al. | | |
| 2014/0092514 A1 | 4/2014 | Chen | | |
| 2016/0197468 A1 * | 7/2016 | Bandel | ............... | H02H 9/06 |
| | | | | 361/118 |

OTHER PUBLICATIONS

Extended European Search Report; Application No. EP 19175688.1; dated Sep. 13, 2019; 9 pages.

* cited by examiner

DUAL MODE PHASE-TO-PHASE SURGE PROTECTIVE DEVICES

CROSS-REFERENCE TO RELATED APPLICATIONS

This application is a continuation of U.S. application Ser. No. 15/148,095, filed May 6, 2016, which claims the benefit of U.S. Provisional Application No. 62/157,907, filed on May 6, 2015, each of which is hereby incorporated herein by reference in its entirety.

BACKGROUND

1. Field

The present disclosure relates generally to the field of surge protection devices. More particularly, the present disclosure relates to surge protection devices with multi-mode surge protection, and with one or more indicators indicating the operational status of the surge protection device.

2. Related Art

Figure 1:
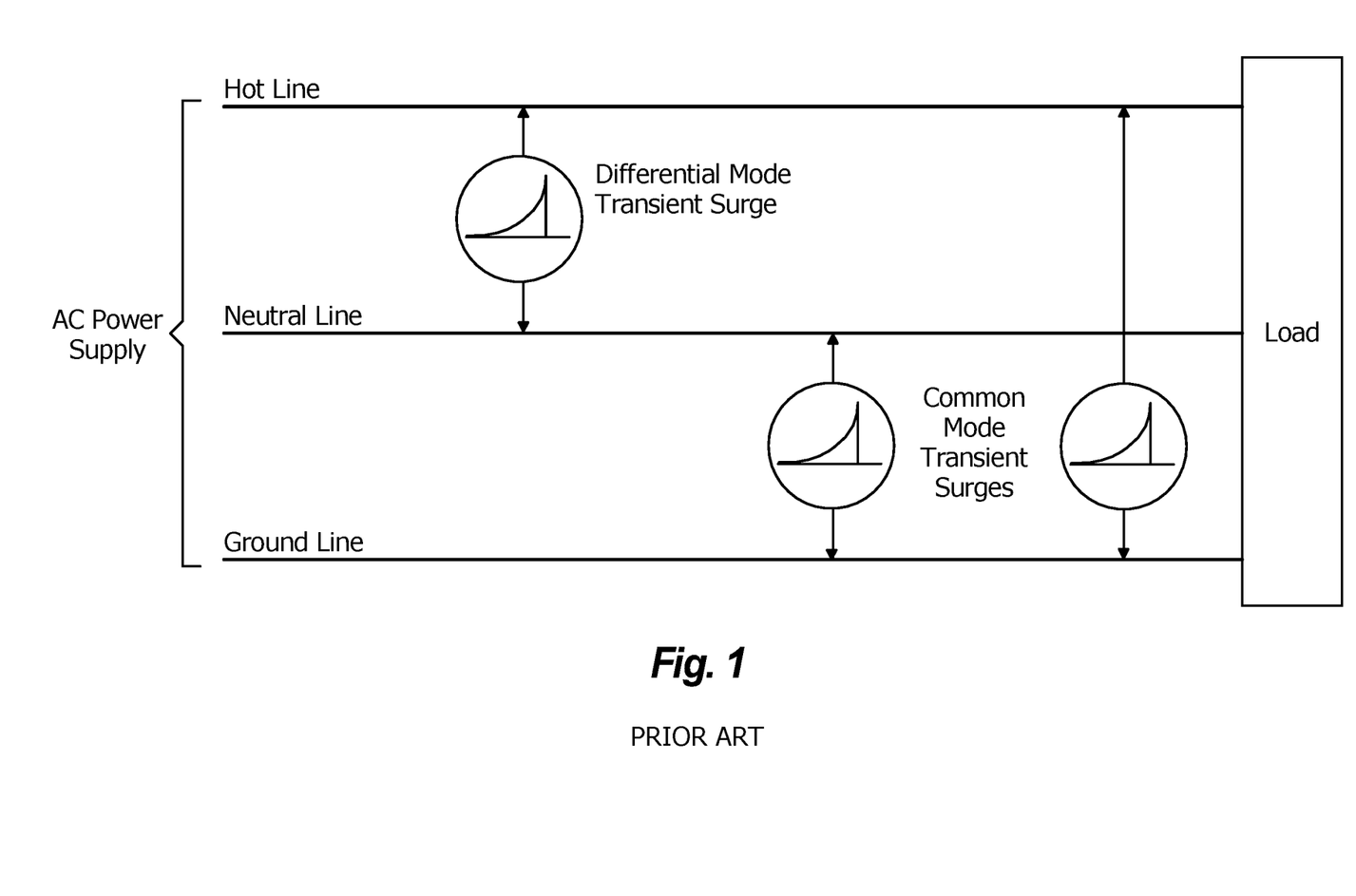
FIG. 1 is a diagrammatic representation of AC power lines and illustrating differential mode transient surges and common mode transient surges on the lines.

In AC power circuits, common mode transient surges tend to be generated by external events, such as lightening, and differential mode transient surges tend to be generated by internal circuit events, such as switching of lights on and off, or switching power supplies. Referring to FIG. 1, a common mode transient surge is a voltage transient that elevates the voltage between a line (or hot) wire and the ground wire, and between a neutral wire and the ground wire at the same time. A differential mode transient surge is one in which a voltage transient appears between the line wire and the neutral wire. Common mode surges and differential mode surges may negatively impact loads connected to the AC power circuits. To minimize negative impact a surge may have, surge protection devices are deployed to prevent voltage surges from reaching loads connected to the AC power circuit. However, when current surge protectors reach an end of life condition, power may still be available to a load even though the surge protector may no longer be operational.

SUMMARY

The present disclosure provides a surge protector having a hot line, a load line, a neutral line, and a ground line. The surge protector has a fuse coupled between the hot line and the load line to protect loads from current surges. A differential mode protection circuit is coupled between the load line and the neutral line to protect loads from differential mode transient voltage surges. A common mode protection circuit is coupled to the load line, the neutral line and the ground line to protect loads from common mode transient voltage surges. An indicator circuit monitors the differential mode protection circuit and the common mode protection circuit to provide an indication as to the operational status of the surge protector.

In one embodiment of the surge protector according to the present disclosure, the fuse is coupled between the hot line and the load line, the differential mode protection circuit is coupled between the load line and the neutral line, and the common mode protection circuit is coupled to the load line, the neutral line and the ground line. The indicator circuit is coupled at least between the load line and the neutral line, and is capable of indicating an operational status of the surge protector. In one embodiment, the indicator circuit has a power source that is substantially DC, and an indicator configured to activate when the surge protector is operational. Alternatively, the indicator can be configured to activate when the surge protector is not operational. The indicator is preferably a visible indicator, however, other indicators may be used, such as an audible indicator. The visible indicator may be a light source, such as a light emitting diode.

In one embodiment, the differential mode protection circuit includes at least one surge suppressor coupled between the load line and the neutral line. The at least one surge suppressor may be a varistor, such as a metal oxide varistor. And, common mode protection circuit includes at least one surge suppressor coupled between the load line and the ground line, and at least one surge suppressor coupled between the neutral line and the ground line. In one embodiment, the at least one surge suppressor may be a varistor, such as a metal oxide varistor. In another embodiment, the at least one surge suppressor may be a gas discharge suppressor, such as a gas discharge tube. Preferably, the common mode protection circuit includes three surge suppressors, where a first surge suppressor is coupled between the ground line and an intermediate node, a second surge suppressor is coupled between the load line and the intermediate node, and a third surge suppressor coupled between the neutral line and the intermediate node.

In another embodiment of the surge protector according to the present disclosure, the fuse is coupled between the hot line and the load line, the differential mode protection circuit has at least one surge suppressor coupled between the load line and the neutral line, and the common mode protection circuit is coupled to the load line, the neutral line and the ground line. In this embodiment, the common mode protection circuit includes a first surge suppressor coupled between the ground line and an intermediate node, a second surge suppressor coupled between the load line and the intermediate node, and a third surge suppressor coupled between the neutral line and the intermediate node.

The present disclosure also provides surge protection devices. In one embodiment, the surge protection device includes a housing, a hot line, a load line, a neutral line, and a ground line, a fuse coupled between the hot line and the load line, a differential mode protection circuit coupled between the load line and the neutral line, and a common mode protection circuit coupled to the load line, the neutral line and the ground line. An indicator circuit may be coupled at least between the load line and the neutral line, and is capable of indicating an operational status of the surge protection device.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The following description and drawings are illustrative and are not to be construed as limiting. Numerous specific details are described to provide a thorough understanding of the disclosure. However, in certain instances, well known or conventional details are not described in order to avoid obscuring the description.

Reference in this specification to "one embodiment," "an embodiment" or the like means that a particular feature, structure, characteristic, advantage or benefit described in connection with the embodiment may be included in at least one embodiment of the disclosure, but may not be exhibited by other embodiments. The appearances of the phrase "in one embodiment" in various places in the specification are not necessarily all referring to the same embodiment, nor are separate or alternative embodiments mutually exclusive of other embodiments. Similarly, various requirements are described which may be requirements for some embodiments but not for other embodiments. The specification and drawings are to be regarded in an illustrative sense rather than a restrictive sense. Various modifications may be made thereto without departing from the spirit and scope as set forth in the claims.

Figure 2:
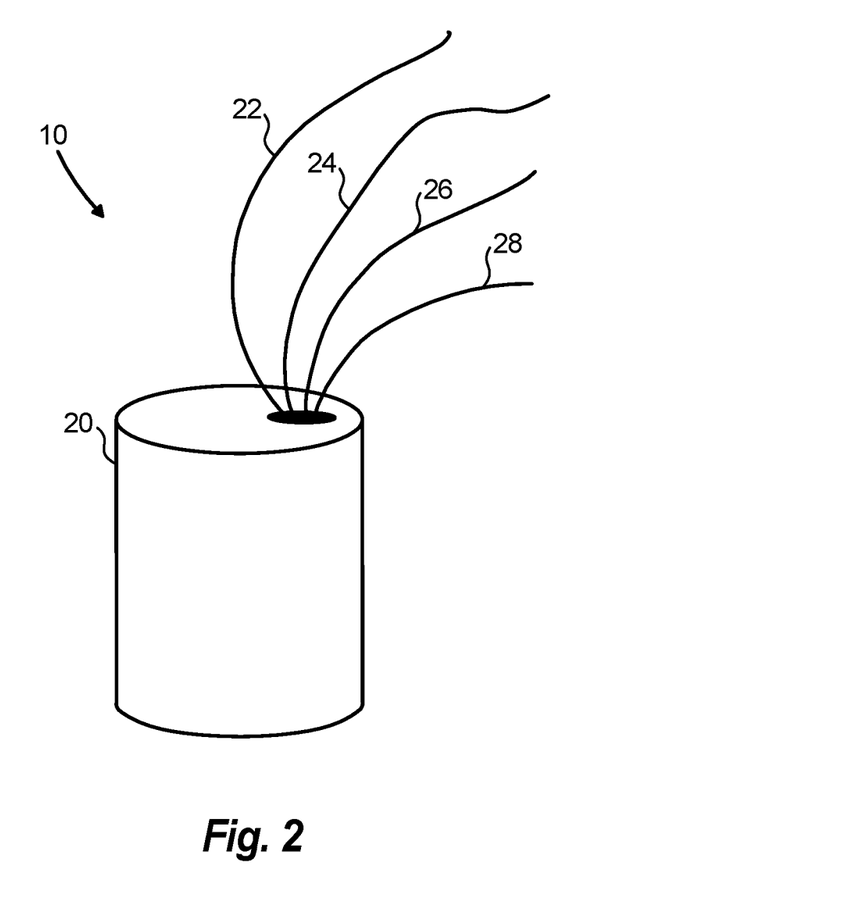
FIG. 2 is a diagrammatic illustration of an exemplary embodiment of a surge protection device according to the present disclosure.

Referring to FIG. 2, an exemplary embodiment of a surge protection device 10 according to the present disclosure is shown. In this exemplary embodiment, the surge protection device 10 includes a housing 20 and a set of electrical connections 22, 24, 26 and 28 that provide electrical connections to a surge protection circuit positioned within the housing 20. The housing 20 shown is a cylindrical housing, however, the housing can come in many shapes and sizes to fit within a desired environment. For example, the housing can be rectangular or square in shape. The electrical connections shown are terminal wires, where wire 22 is a hot connection point, wire 24 is a load connection point, wire 26 is a neutral connection point, and wire 28 is a ground connection point. However, the electrical connections can be any conventional type of terminal connections, such as terminal lugs or set screws.

Figure 3:
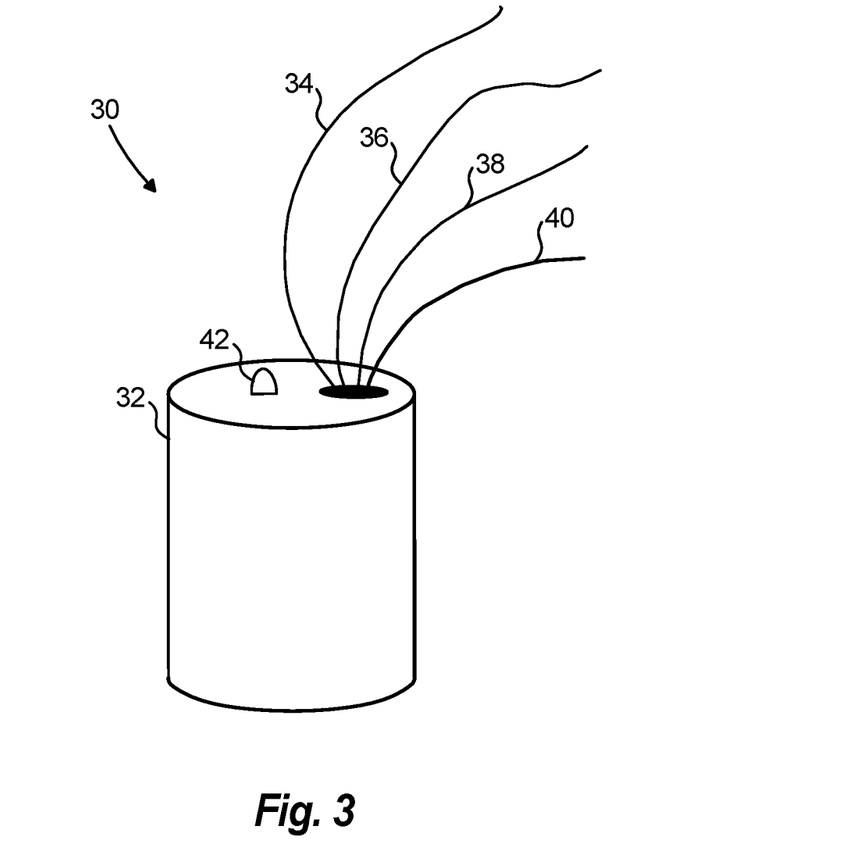
FIG. 3 is a diagrammatic illustration of another exemplary embodiment of a surge protection device according to the present disclosure.

Referring to FIG. 3, another exemplary embodiment of a surge protection device 30 according to the present disclosure is shown. In this exemplary embodiment, the surge protection device 30 includes a housing 32, a set of electrical connections 34, 36, 38 and 40 that provide electrical connections to a surge protection circuit positioned within the housing 30, and an indicator 42. Similar to the embodiment of FIG. 2, the housing 30 shown is a cylindrical housing, however, the housing can come in many shapes and sizes to fit within a desired environment. For example, the housing can be rectangular or square in shape. The electrical connections shown are terminal wires, where wire 34 is a hot connection point, wire 36 is a load connection point, wire 38 is a neutral connection point, and wire 40 is a ground connection point. However, the electrical connections can be any conventional type of terminal connections, such as terminal lugs or set screws.

Figure 4:
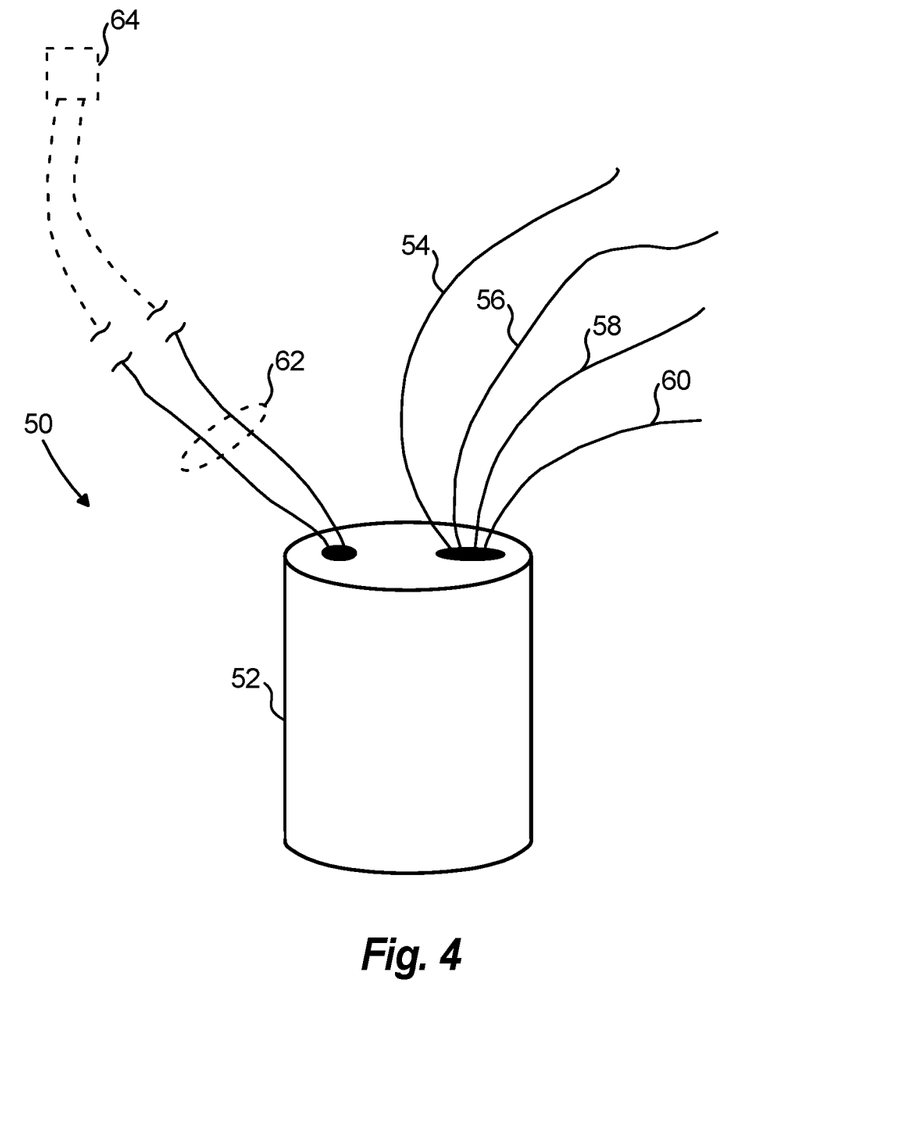
FIG. 4 is a diagrammatic illustration of another exemplary embodiment of a surge protection device according to the present disclosure.

Referring to FIG. 4, another exemplary embodiment of a surge protection device 50 according to the present disclosure is shown. In this exemplary embodiment, the surge protection device 50 includes a housing 52, a set of electrical connections 54, 56, 58 and 60 that provide electrical connections to a surge protection circuit positioned within the housing 52, and a set of electrical connections 62 for connection to a remote indicator 64, shown as dashed lines in FIG. 4. Connection to a remote indicator 64 allows an end-user to determine an operational status of the surge protection device 50 by inspection at a more convenient location in the event the surge protection device 50 were installed in a location that is not easily accessible for inspection.

Similar to the embodiments above, the housing 50 shown is a cylindrical housing, however, the housing can come in many shapes and sizes to fit within a desired environment. For example, the housing can be rectangular or square in shape. The electrical connections 54, 56, 58 and 60 shown are terminal wires, where wire 54 is a hot terminal connection point, wire 56 is a load terminal connection point, wire 58 is a neutral terminal connection point, and wire 60 is a ground terminal connection point. However, the electrical connections can be any conventional type of terminal connections, such as terminal lugs or set screws. The set of electrical connections 62 for a remote indicator are shown in FIG. 4 as wire terminal connections. However, the electrical connections 62 can be any conventional type of terminal connections, such as terminal lugs or set screws. Alternatively, the electrical connections to the remote indicator may be via a wireless communication link where the surge protection device transmits a signal via known transmitter circuitry, seen in FIG. 10, to activate or deactivate a remote indicator.

Figure 5:
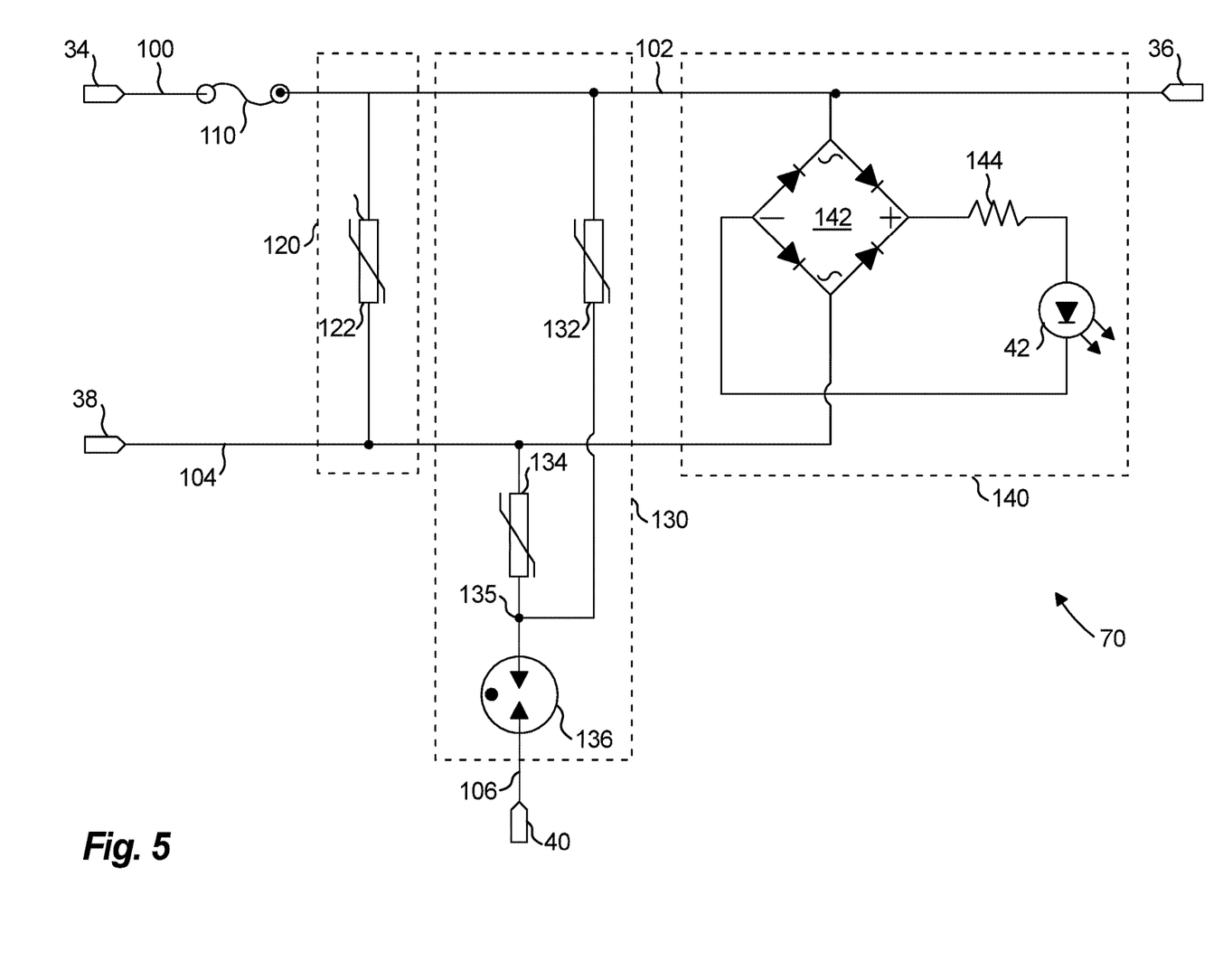
FIG. 5 is a circuit diagram for an exemplary embodiment of a surge protection circuit according to the present disclosure.

Referring to FIG. 5, a circuit diagram of an exemplary embodiment of a surge protection circuit 70 that can be included in a surge protection device 10, 30 or 50 is shown. In this exemplary embodiment, the surge protector circuit 70 has a fuse 110, a differential mode protection circuit 120, a common mode protection circuit 130 and an indicator circuit 140. The fuse 110 is connected between an alternating current (AC) input 100, also referred to as a hot line 100 having a terminal connection 34, and an AC output 102, also referred to as a load line 102 having a terminal connection 36, as shown in FIG. 5. The fuse 110 is preferably rated for 2-3 times the maximum current rating of the load rating of the device in which the surge protector circuit 70 is used. For example, if the AC load rating of the device in which the surge protector circuit is used were for 7 amps at 277 VAC, the fuse 110 would be rated at or between about 14 amps (2 times) and 21 amps (3 times). An example of a suitable fuse 110 is the 0328 series manufactured by Littlefuse, Inc. Surge events on the hot line 100 may cause increased current flow temporarily through the fuse 110. If the current through the fuse 110 exceeds the rating of the fuse, the fuse blows causing an open circuit between the hot line 100 and the load line 102 thus electrically isolating loads connected to load terminal connection 36 and a neutral terminal connection 38. This electrical isolation protects the loads from subsequent current aberrations in the AC power.

The differential mode protection circuit 120 is coupled between the load line 102 and an AC neutral, also referred to as a neutral line 104 having the neutral terminal connection 38. The differential mode protection circuit 120 is one of the circuits providing the multi-mode surge protection for the surge protection device 10, 30 or 50. The differential mode protection circuit 120 is configured to absorb and dissipate differential mode transient voltage surges across the load line 102 and the neutral line 104. In the exemplary embodiment shown in FIG. 5, the differential mode protection circuit 120 includes a transient suppressor 122 coupled between the load line 102 and the neutral line 104. The transient suppressor 122 shown in FIG. 5 is a varistor. While the exemplary embodiment of FIG. 5 shows a varistor 122 as the transient suppressor providing the differential mode surge protection, other transient suppressors and surge protection circuits can be used to provide the differential mode surge protection. For example, the transient suppressor may be transient-voltage-suppression diodes.

For ease of description, the transient suppressor 122 will be described as a varistor. Preferably, the varistor 122 is one that shorts when it fails, i.e., reached an end of life condition, and preferably the varistor is a metal oxide varistor (MOV). An example of a suitable metal oxide varistor, under certain test conditions, is a metal oxide varistor having a maximum energy rating of about 445 joules, a maximum operating voltage rating of about 320 volts, a maximum current rating of about 20K amps, and maximum breakdown or clamping voltage of about 840 volts. An example of a suitable, metal oxide varistor is the SIOV S25K320E manufactured by TDK/Epcos. A metal oxide varistor has a high impedance when typical AC voltages (e.g., 277 VAC) are applied across its terminals so that the metal oxide varistor appears as an open circuit. However, when a transient voltage surge occurs across the metal oxide varistor's terminals, the high impedance of the metal oxide varistor drops creating a conductive path between its terminals allowing the metal oxide varistor to absorb and dissipate the transient energy. Thus, a differential mode transient surge across the load line 102 and the neutral line 104 causes the impedance of the varistor 122 to decrease sufficiently to permit current to flow between the load line 102 and the neutral line 104, with the metal oxide varistor 122 absorbing and dissipating the energy from the differential mode surge. As a result, loads connected to the load line terminal 36 of the surge protection device 10, 30 or 50 are protected from the differential mode transient voltage surges.

The common mode protection circuit 130 is coupled between the load line 102, the neutral line 104, and electrical ground also referred to as a ground line 106 having a ground terminal 40, as shown in FIG. 5. The common mode protection circuit 130 is another one of the circuits providing the multi-mode surge protection for the surge protection device. Preferably, the common mode protection circuit 130 provides a multi-stage surge protection circuit configured to absorb and dissipate common mode transient voltage surges on the load line 102 and/or the neutral line 104. In the exemplary embodiment shown in FIG. 5, the common mode protection circuit 130 includes a transient suppressor 132 coupled between the load line 102 and an intermediate node 135, a transient suppressor 134 coupled between the neutral line 104 and the intermediate node 135, and a transient suppressor 136 coupled between the intermediate node 135 and the ground line 106. The transient suppressors 132 and 134 shown in FIG. 5 are varistors, and the transient suppressor 136 is a gas discharge suppressor. While the exemplary embodiment of FIG. 5 shows varistors 132 and 134, and glass discharge suppressor 136 providing the common mode surge protection, other transient suppressors and surge protection circuits can be used to provide the common mode surge protection. For example, the transient suppressors may be transient-voltage-suppression diodes, or transient-voltage-suppression diodes in combination with varistors, or transient-voltage-suppression diodes in combination with gas discharge suppressors, or transient-voltage-suppression diodes in combination with varistors and gas discharge suppressors, or any combination thereof.

For ease of description, the transient suppressors 132 and 134 will be described as a varistors, and the transient suppressor 136 will be described as a gas discharge suppressor. Preferably, the varistors 132 and 134 are varistors that short when they fail, i.e., reached an end of life condition, and preferably the varistors are metal oxide varistors, as described above. Preferably, the gas discharge suppressor 136 is a gas discharge tube having a spark-over voltage of about 470 volts, a maximum surge current rating of about 25K amps. An example of a suitable gas discharge suppressor is a gas discharge tube, such as the A81-A470X gas discharge tube manufactured by TDK/Epcos.

As described above, metal oxide varistors have a high impedance when typical AC voltages (e.g., 277 VAC) are applied across its terminals so that the metal oxide varistor appears as an open circuit. However, when a transient voltage surge occurs across the metal oxide varistor's terminals, the high impedance of the metal oxide varistor drops creating a conductive path between its terminals allowing the metal oxide varistor to absorb and dissipate the transient energy. Similarly, gas discharge tubes have a high impedance when typical AC voltages (e.g., 277 VAC) are applied across its terminals so that the gas discharge tube appears as an open circuit. However, when a common mode transient voltage surge occurs across the gas discharge tube's terminals, the high impedance of the gas discharge tube drops creating a conductive path between its terminals allowing the gas discharge tube to absorb and dissipate the transient energy. It should be noted, that gas discharge suppressors typically have a well-defined spark-over voltage. Thus, a common mode transient voltage surge between the load line 102 and the ground line 106 causes the impedance of the metal oxide varistor 132 and gas discharge tube 136 to decrease sufficiently to permit current to flow between the load line 102 and the ground line 106, with the metal oxide varistor 132 and the gas discharge tube 136 absorbing and dissipating the energy from the common mode transient voltage surge. Further, a common mode transient voltage surge between the neutral line 104 and the ground line 106 causes the impedance of the metal oxide varistor 134 and gas discharge tube 136 to decrease sufficiently to permit current to flow between the neutral line 104 and the ground line 106, with the metal oxide varistor 134 and the gas discharge tube 136 absorbing and dissipating the energy from the common mode transient voltage surge. As a result, loads connected to the load line terminal connection 36, neutral line terminal connection 38, and the ground terminal connection 40 of the surge protection device 10, 30 or 50 are protected from the common mode surges.

Figure 6A:
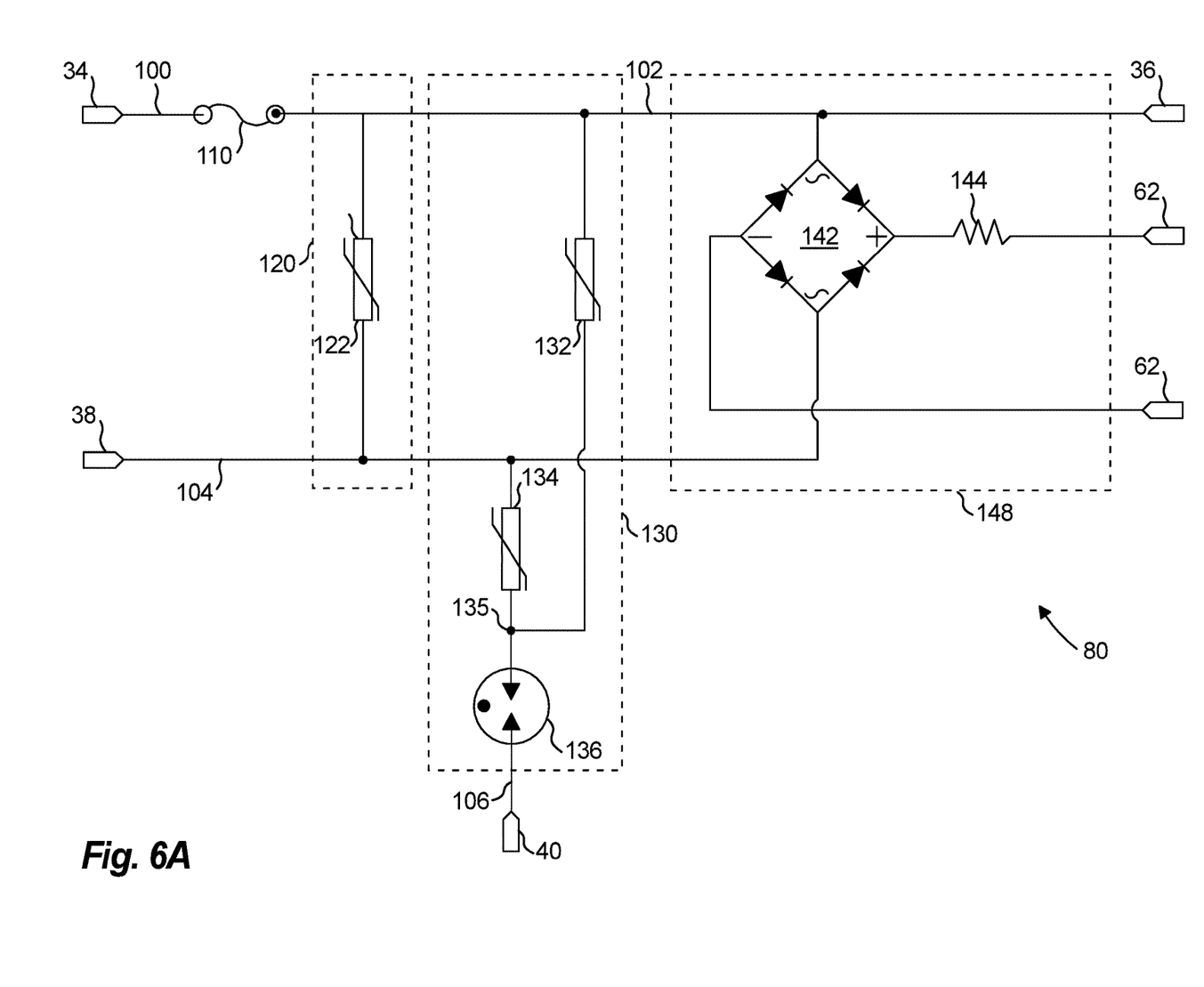
FIG. 6A is a circuit diagram for another exemplary embodiment of a surge protection circuit according to the present disclosure.

The indicator circuit 140 is coupled between the load line 102 and the neutral line 104. The indicator circuit 140 provides an indication of an operational status of the surge protection device 30 or 50. In the exemplary embodiment shown in FIG. 5, the indicator circuit 140 includes a rectifier 142, preferably a full bridge rectifier, coupled to receive AC power across the load line 102 and the neutral line 104. The rectifier 142 generates pulsed DC power across resistor 144 and indicator 42, seen also in FIG. 3 and preferably a light emitting diode, coupled in series. In this configuration, when power is on the load line 102, the light emitting diode 42 illuminates, which indicates that the differential mode protection circuit 120 and the common mode protection circuit 130 are operational, and thus the surge protection device 30 or 50 are operational. If the fuse 110 blows, or if either the differential mode protection circuit 120 or the common mode protection circuit 130 are not operational, i.e., either circuit fails causing a short circuit, the indicator 42 will cease to illuminate providing a visual indication that the surge protection device 30 or 50 is not operational. Thus, an end-user can inspect the indicator 42 of a surge protection device 30 or 50 to quickly determine the operational status of the surge protection device. While the exemplary embodiment of FIG. 5 shows a visual indicator circuit 140, one skilled in the art will readily recognize that other indicator circuits and other indicators may be used. For example, an audible indicator may be used with corresponding circuit components to activate and deactivate the audible indicator. Alternatively, as shown in FIG. 6A and referring also to FIG. 4, the surge protection circuit 80, which is similar to surge protection circuit 70 except that the indicator circuit 140 is replaced with indicator driver circuit 148. The indicator driver circuit includes rectifier 142 and resistor 144 and connects to electrical connections 62 to remotely activate and deactivate a remote indicator 64, as shown in FIG. 4.

Figure 6B:
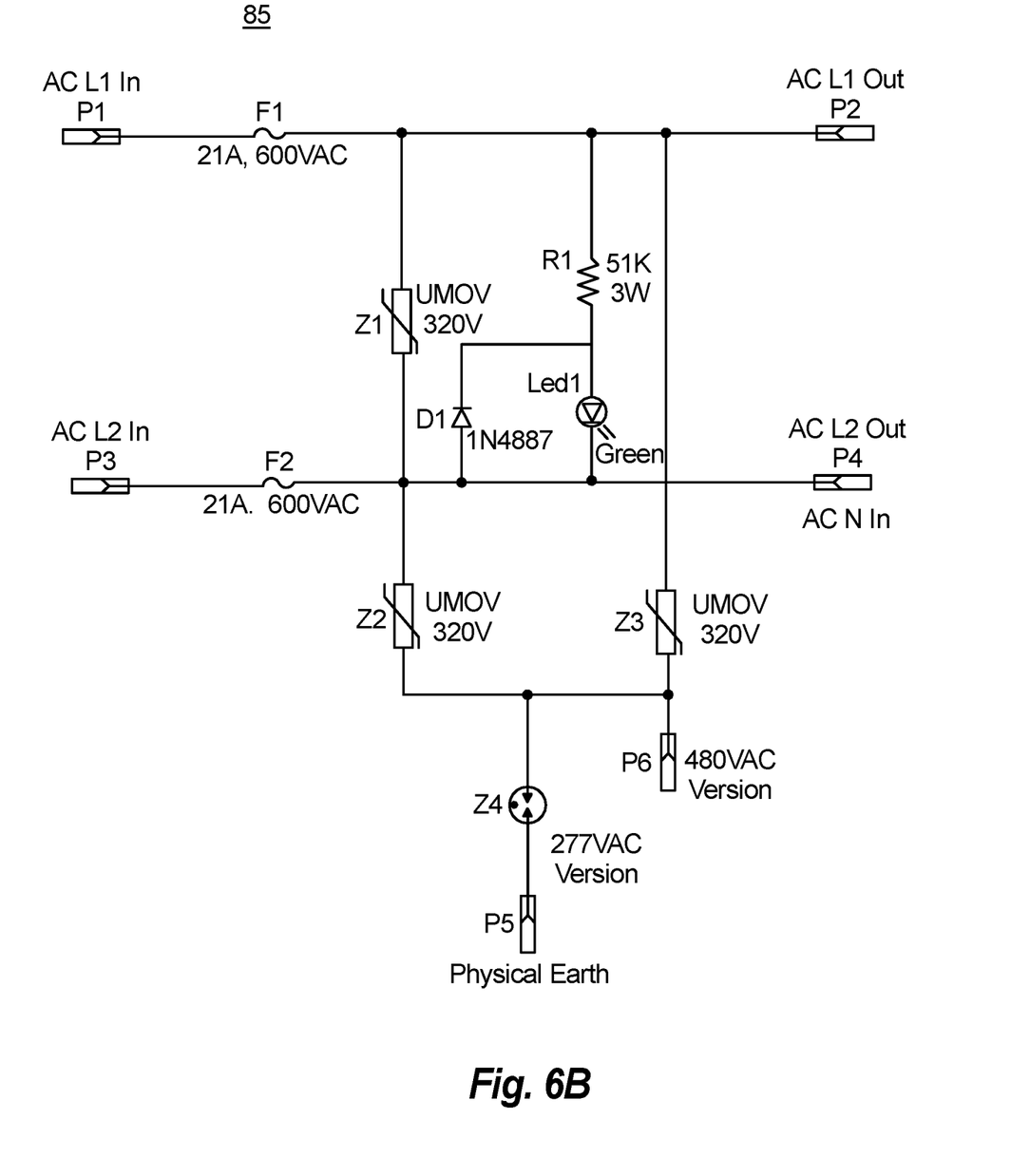
FIG. 6B is a circuit diagram for another exemplary embodiment of a surge protection circuit according to the present disclosure.

Referring to FIG. 6B, a circuit diagram of another exemplary embodiment of a surge protection circuit 85 that can be included in a surge protection device 10, 30 or 50 is shown. This exemplary embodiment is applicable in phase-to-phase applications and is operable at 480 VAC and other VACs. The surge protection circuit 85 includes 6 terminal connections P1-P6. The surge protection circuit 85 has a fuse F1 coupled between the first hot line from AC input AC L1 In P1 and the AC output load line AC L1 Out P2, and an additional fuse F2 coupled between the second hot line from AC input AC L2 In P3 and the AC output load line AC L2 Out P4. Fuse F2 is functionally adjacent to the AC input terminal connection AC L2 In P3, e.g., fuse F2 is coupled in the AC line between AC terminal connection AC L2 In P3 and the other illustrated circuit elements connected thereto. Optionally, one or both of fuses F1 and F2 have a rating of 600 VAC. An example of suitable fuses F1, F2 is the fuse Part #MDH-V-21-R from Cooper Bussmann, a well-known supplier of circuit protection fuses. Employing fuses as shown in FIG. 6B results in a design in which surges from either phase would be accounted for and protected against, which is advantageous because switching of both phases in phase-to-phase applications is standard practice. In addition, the embodiment of FIG. 6B provides a combination of the phase-to-neutral and phase-to-phase applications on the same circuit board design. As illustrated, P4 can act as an AC output AC L2 Out or as a neutral input AC N In. In the phase-to-neutral application (as shown, e.g., in FIG. 5), AC L1 In P1 is connected to an AC input, AC L1 Out P2 is connectable to a load, AC N In P4 is connected to a neutral line, and P5 is connected to ground; P3 and P6 are not used. In the phase-to-phase application (as described above), AC L1 In P1 is connected to a first AC input, AC L2 In P3 is connected to a second first AC input, AC L1 Out P2 is connectable to a load, AC L2 Out P4 is connectable to the load, and P6 is connected to ground; P5 is not used. Differential mode protection circuit (which includes transient suppressor Z1) and common mode protection circuit (which includes transient suppressors Z2, Z3 and Z4 in phase-to-neutral applications, and includes transient suppressors Z2 and Z3 in phase-to-phase applications) and other features of surge protection circuits described herein are provided as well.

The various components Z1, Z2, etc. indicated in FIG. 6B correspond to like components in FIG. 5 and FIG. 6A, but the ratings may vary as needed to accommodate the voltage rating and the circuit modification attained according to FIG. 6B. FIG. 6B also includes the indicator circuit composed of, e.g., D1, R1 and Led1.

Figure 7:
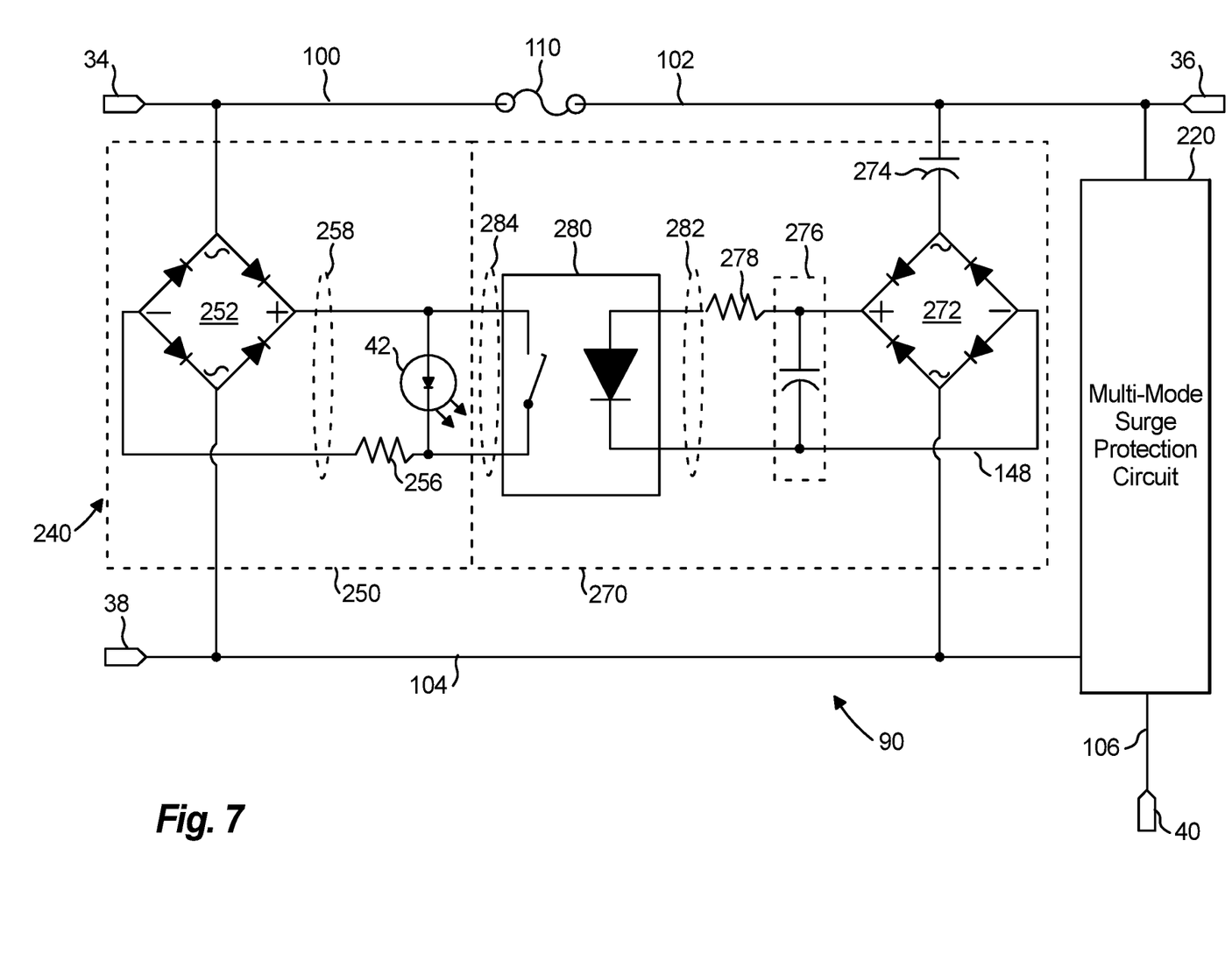
FIG. 7 is a circuit diagram for another exemplary embodiment of a surge protection circuit according to the present disclosure illustrating an opto-coupled solid state relay as a switch.

Referring now to FIG. 7, a circuit diagram of another exemplary embodiment of a surge protection circuit that can be included in a surge protection device according to the present disclosure is shown. In this embodiment, the surge protector circuit 90 has a fuse 110, a multi-mode surge protection circuit 220, and an indicator circuit 240. In this exemplary embodiment, the fuse 110 is connected between the hot line 100 and the load line 102. As noted above, the fuse 110 is preferably rated for 2-3 times the maximum current rating of the load rating of the device in which the surge protector circuit 90 is used. For example, if the AC load rating of the device in which the surge protector circuit is used were for 7 amps at 277 VAC, the fuse 110 would be rated at or between about 14 amps (2 times) and 21 amps (3 times). An example of a suitable fuse 110 is the 0328 series manufactured by Littlefuse, Inc. Surge events on the hot line 100 may cause increased current flow temporarily through the fuse 110. If the current through the fuse 110 exceeds the rating of the fuse, the fuse blows causing an open circuit between the hot line 100 and the load line 102, thus electrically isolating loads connected to load terminal connection 36 and the neutral terminal connection 38. This electrical isolation protects the loads from subsequent current aberrations in the AC power.

The multi-mode surge protection circuit 220 is coupled between the load line 102, the neutral line 104 and the ground line 106, as shown. Preferably, the multi-mode surge protection circuit 220 includes the differential mode protection circuit 120 and the common mode protection circuit 130 described above and shown in FIG. 5. However, other known surge protection circuits may be used to protect loads connected to load terminal connection 36 and neutral terminal connection 38 from transient voltage surges.

In this exemplary embodiment, the indicator circuit 240 includes an indicator section 250 and an indicator control section 270. The indicator section 250 includes rectifier 252, preferably a full bridge rectifier, an indicator 42, also seen in FIG. 3 and preferably a light emitting diode (LED), and a resistor 256 in series with the indicator 42. The indicator control section 270 includes a rectifier 272, preferably a full bridge rectifier, a capacitor 274, a delay circuit 276, a resistor 278 and a switch 280. The indicator circuit 240 is coupled to the hot line 100, the load line 102 and the neutral line 104, and the indicator 42 indicates the operational status of the surge protection device 30 or 50. Preferably, the delay circuit 276 includes a capacitor, and parameters such as the capacitance of capacitor 274 and the capacitor 276 can be selected to control the duration of the delay. However, one skilled in the art would readily recognize that other circuits may be used to provide a delay. The switch 280 is preferably an opto-coupled solid state relay, seen in FIG. 7. An example of an opto-coupled solid state relay, is the PLA 170, manufactured by IXYS, Inc. However, one skilled in the art would readily recognize that other switch types may be used, such as other opto-isolators, seen in FIG. 8, or solid state relays.

In this embodiment, when AC power is first applied to the hot terminal connection 34 and the neutral terminal connection 38, AC power is applied to load terminal connection 36 through the fuse 110, the indicator section 250 activates as will be described below, and the indicator control section 270 is inactive for a period of time as will be described in more detail below.

Continuing to refer to FIG. 7, when power is first applied across the hot terminal connection 34 and the neutral terminal connection 38, the rectifier 252 generates a pulsed DC output 258 which is sufficient to continuously illuminate the indicator 42. At the same time, the rectifier 272, coupled to the load line 102 through a capacitor 274 and to the neutral line 104, generates a pulsed DC output to delay circuit 276 and resistor 278 to drive a pulsed DC output 282 to the input of switch 280. The DC output 282 increases to a steady state value with a delay caused by the delay circuit 276. While the DC output 282 is increasing to its steady state, the switch 280 is in an "off" state such that the impedance across the terminals 284 of the switch 280 is high, and the switch 280 is effectively an open circuit.

Sometime after AC power is applied to the hot line 100, e.g., about one second or less, the pulsed DC output 282 to switch 280 reaches its steady state (or a high state) causing the switch 280 to transition to an "on" state such that the impedance across the terminals 284 is low providing a conductive path for the DC output 258 to bypass the indicator 42 such that the indicator turns off. This timing can be extended by modifying the characteristics of the delay circuit 276, for example.

In this configuration, the indicator 42 turns on immediately after AC power is applied to the hot terminal connection 34 and the neutral terminal connection 38, and the indicator 42 turns off after the switch 280 turns on. The interval from when power is applied to the terminal connections 34 and 38 in which the indicator 42 turns "on" until the switch 280 turns "on" provides a visual confirmation that the indicator circuit section 250 and the indicator control section are operational.

If the fuse 110 blows, or if either the differential mode protection circuit 120 or the common mode protection circuit 130 in the multi-mode surge protection circuit 220 are not operational, i.e., either circuit fails causing a short circuit an thus blowing fuse 110, the switch 280 will turn "off" and the indicator 42 will turn "off" providing an indication that the surge protection device 30 is no longer operational. Thus, an end-user can inspect the indicator 42 of a surge protection device 30 to quickly determine the operational status of the surge protection device. While the exemplary embodiment of FIG. 7 shows a visual indicator circuit section 250, one skilled in the art will readily recognize that other indicator circuits and other indicators may be used. For example, an audible indicator may be used with corresponding circuit components to activate the audible indicator.

Figure 8:
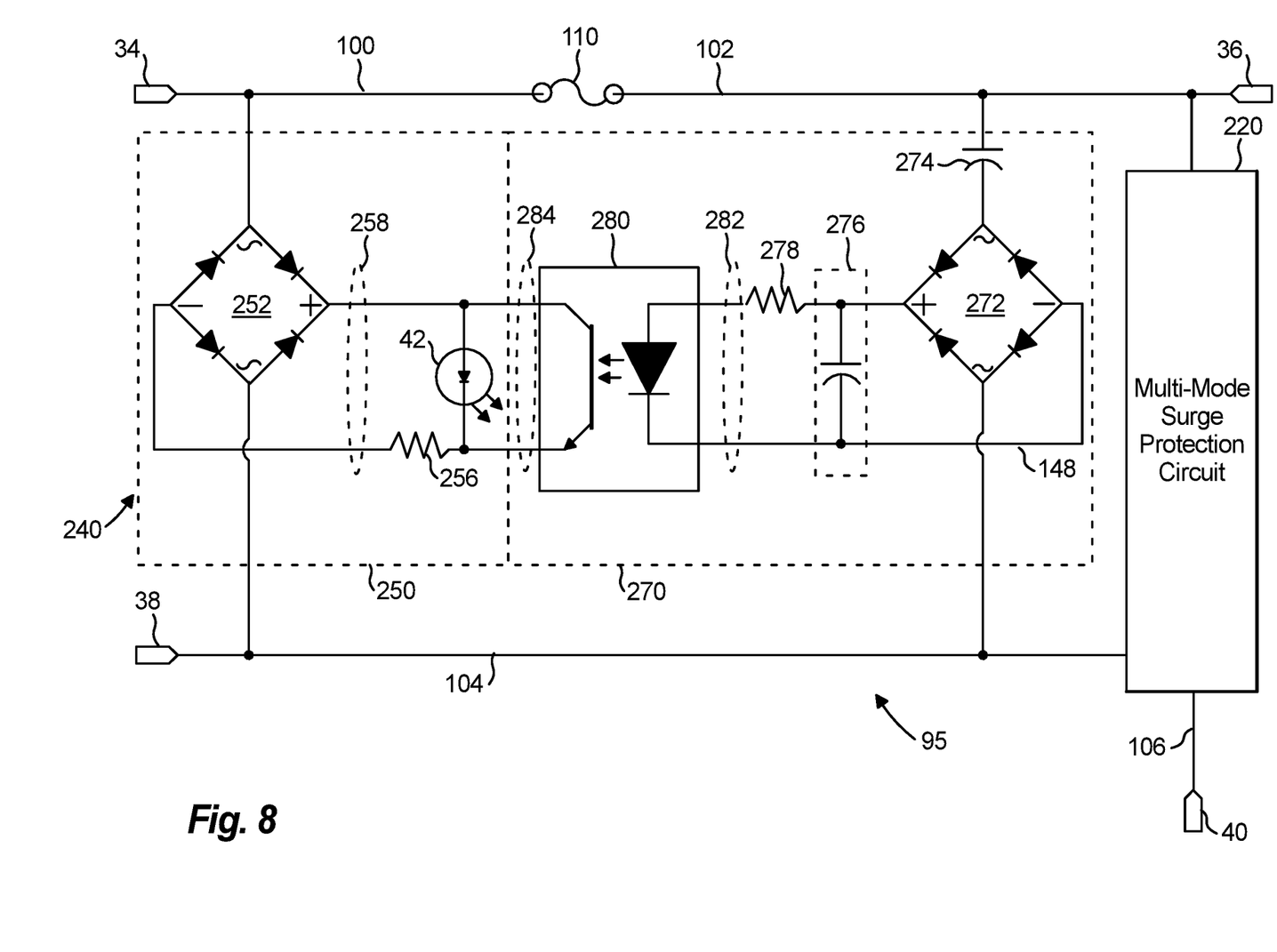
FIG. 8 is a circuit diagram for another exemplary embodiment of a surge protection circuit according to the present disclosure illustrating an opto-coupler as a switch.
Figure 9:
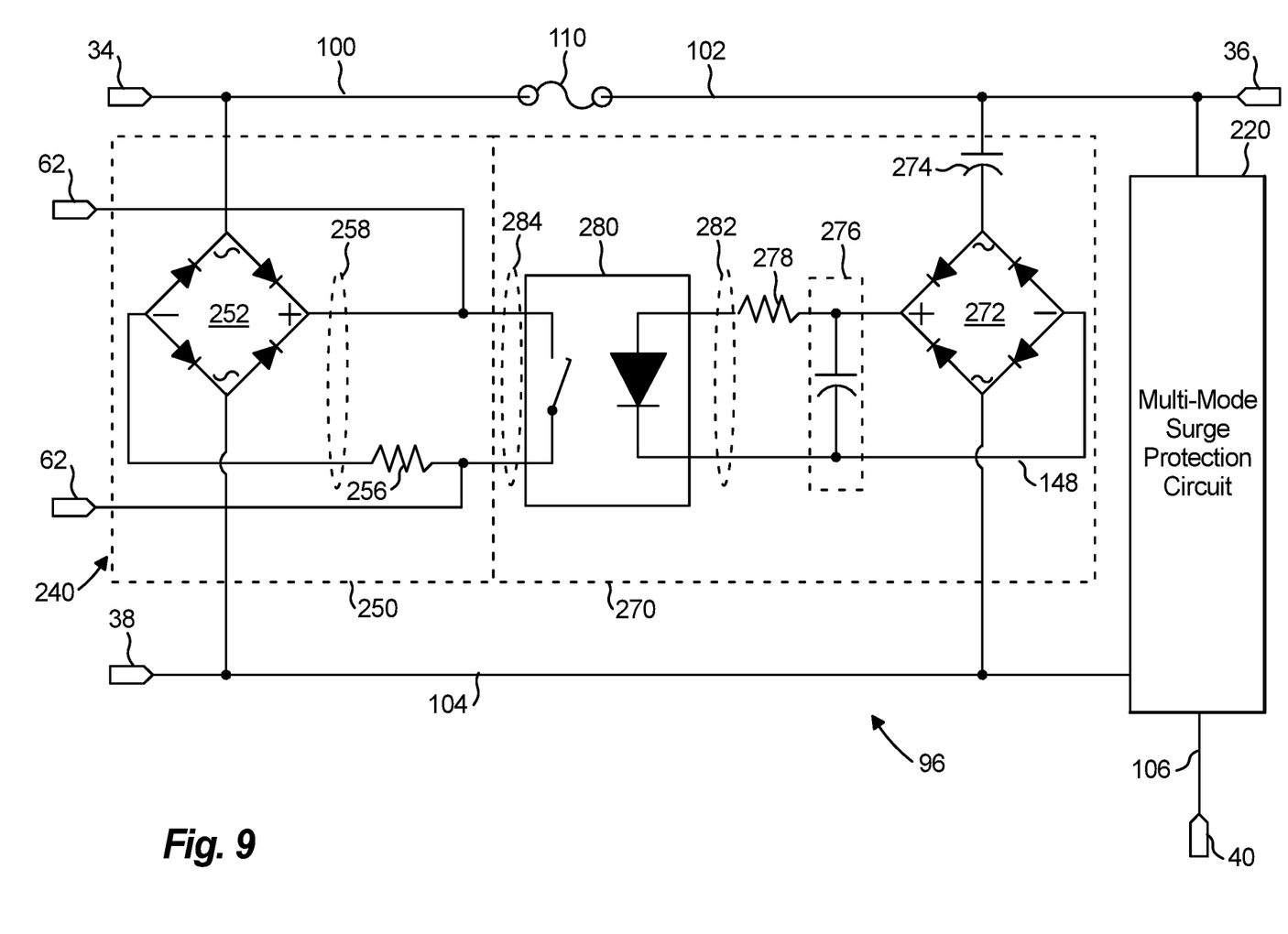
FIG. 9 is a circuit diagram for another exemplary embodiment of a surge protection circuit according to the present disclosure.
Figure 10:
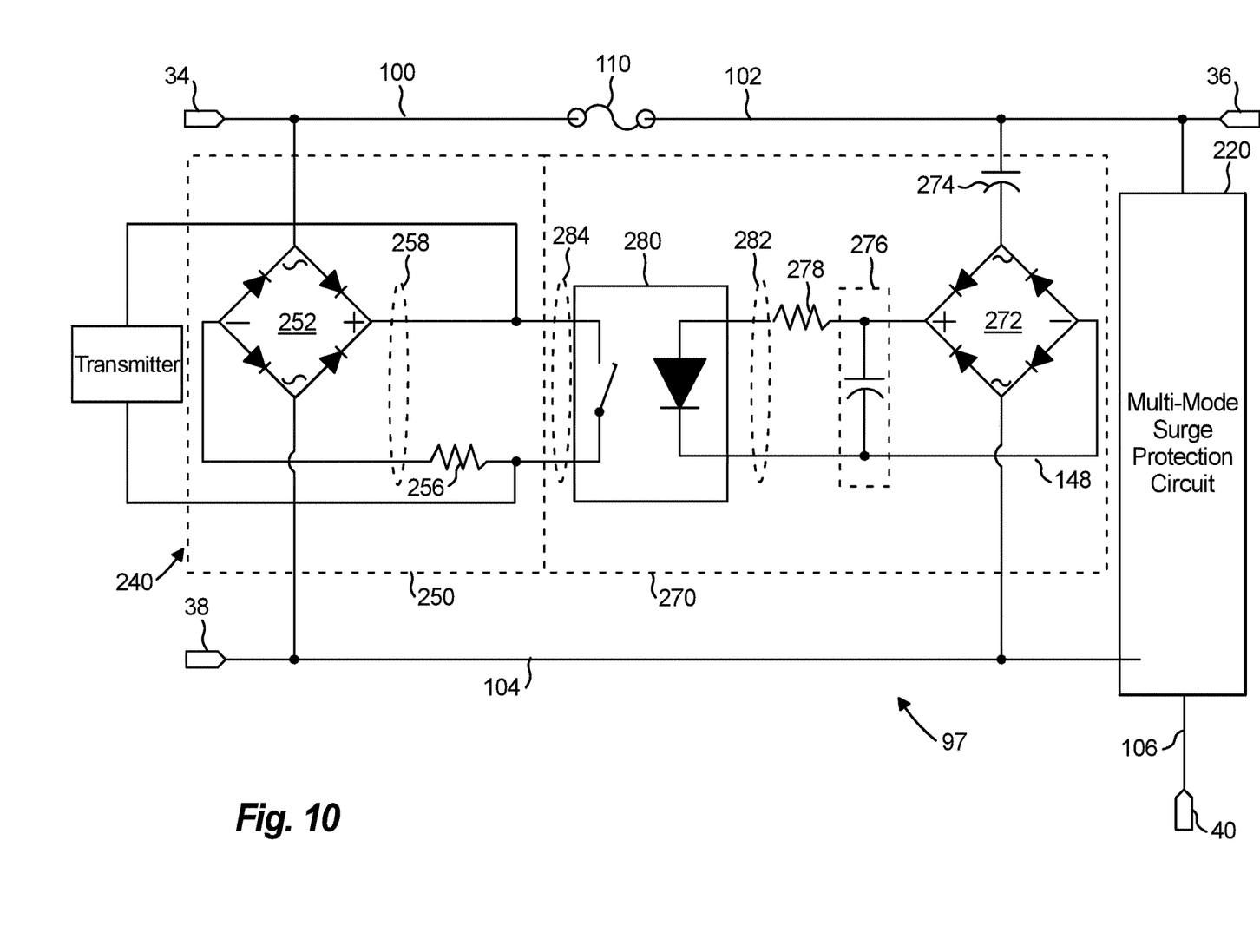
FIG. 10 is a circuit diagram for another exemplary embodiment of a surge protection circuit according to the present disclosure.

Alternative embodiments of FIG. 7 are illustrated in FIGS. 8-10. Components having identical reference numerals in FIGS. 8-10 are the same as those described with regard to FIG. 7, unless indicated otherwise.

Alternatively, as shown in FIG. 8 and referring also to FIG. 7, the surge protection circuit 95, which is similar to surge protection circuit 90 in FIG. 7, except that the opto-coupled switch 280 of indicator circuit 240 in FIG. 7 is replaced with an opto-isolator switch 280. In this embodiment, the surge protector circuit 95 has the fuse 110, the multi-mode surge protection circuit 220, and the indicator circuit 240. The indicator driver circuit includes the rectifier 252 and the resistor 256 and connects to electrical connections 62 to remotely activate and deactivate a remote indicator 64.

Alternatively, as shown in FIG. 9 and referring also to FIG. 7, the surge protection circuit 96, which is similar to surge protection circuit 90 in FIG. 7, except that the indicator 42 of indicator circuit 240 in FIG. 7 is removed. In this embodiment, the surge protector circuit 96 has the fuse 110, the multi-mode surge protection circuit 220, and the indicator circuit 240. The indicator driver circuit 250 includes the rectifier 252 and the resistor 256 and connects to electrical connections 62 to remotely activate and deactivate a remote indicator 64.

Alternatively, as shown in FIG. 10 and referring also to FIG. 7, the surge protection circuit 97, which is similar to surge protection circuit 90 in FIG. 7, except that a transmitter is connected to added to the indicator section 250 in place of indicator 42, as seen in FIG. 7. In this embodiment, the surge protector circuit 97 has the fuse 110, the multi-mode surge protection circuit 220, and the indicator circuit 240. An indicator driver circuit 250 includes rectifier 252 and resistor 256.

The foregoing specification provides a description with reference to specific exemplary embodiments. The specification and drawings are to be regarded in an illustrative sense rather than a restrictive sense. Various modifications may be made thereto without departing from the spirit and scope as set forth in the following claims.

What is claimed is:

1. A surge protector having a first terminal connection electrically coupled to a second terminal connection, a third terminal connection electrically coupled to a fourth terminal connection, an intermediate node, and a ground line, the surge protector comprising:
   a differential mode protection circuit coupled between the first terminal connection and the third terminal connection; and
   a common mode protection circuit coupled to the first terminal connection and the third terminal connection and the ground line,
   wherein in a phase-to-neutral configuration, the surge protector further comprises a phase-to-neutral terminal connection, and a surge suppressor connected between the intermediate node and a fifth terminal connection (P5), and wherein the first terminal connection (P1) is a first hot line, the second terminal connection (P2) is a first load line, the fourth terminal connection (P4) is a neutral line, and the fifth terminal connection (P5) is the ground line, and
   wherein in a phase-to-phase configuration, the surge protector further comprises a phase-to-phase terminal connection connected to the intermediate node, and wherein the first terminal connection (P1) is the first hot line, the second terminal connection (P2) is the first load line, the third terminal connection (P3) is a second hot line, the fourth terminal connection (P4) is a second load line, and the sixth terminal connection (P6) is the ground line.

2. The surge protector of claim 1, further comprising an indicator circuit coupled at least between the second terminal connection and the fourth terminal connection and capable of indicating an operational status of the surge protector.

3. The surge protector of claim 2, wherein the indicator circuit comprises an indicator configured to be activated when the surge protector is operational.

4. The surge protector of claim 2, wherein the indicator comprises at least one of a visible indicator, a light source and an audible indicator.

5. The surge protector of claim 1, wherein the differential mode protection circuit comprises at least one surge suppressor coupled between the second terminal connection and the fourth terminal connection.

6. The surge protector of claim 5, wherein the at least one surge suppressor comprises a varistor.

7. The surge protector of claim 6, wherein the varistor comprises a metal oxide varistor.

8. The surge protector of claim 1, wherein the common mode protection circuit comprises at least one surge suppressor between the second terminal connection and the ground line.

9. The surge protector of claim 8, wherein the at least one surge suppressor comprises a varistor.

10. The surge protector of claim 9, wherein the varistor comprises a metal oxide varistor.

11. The surge protector of claim 1, wherein the common mode protection circuit comprises at least one surge suppressor between the fourth terminal connection and the ground line.

12. The surge protector of claim 11, wherein the at least one surge suppressor comprises a varistor.

13. The surge protector of claim 12, wherein the varistor comprises a metal oxide varistor.

14. The surge protector of claim 1, further comprising an indicator circuit coupled at least between the second terminal connection and the fourth terminal connection and having a transmitter capable of transmitting a signal indicating an operational status of the surge protector.

15. The surge protector of claim 1, further comprising:
a first fuse coupled between the first terminal connection and the second terminal connection; and
a second fuse coupled between the third terminal connection and the fourth terminal connection.

16. A surge protector having a first terminal connection electrically coupled to a second terminal connection, a third terminal connection electrically coupled to a fourth terminal connection, and an intermediate node, the surge protector comprising:
a first fuse having a line side electrically coupled to the first terminal connection and a load side electrically coupled to the second terminal connection;
a second fuse having a line side electrically coupled between the third terminal connection and a load side electrically coupled to the fourth terminal connection;
a differential mode protection circuit coupled between the load side of the first fuse and the load side of the second fuse; and
a common mode protection circuit coupled to the load side of the first fuse, the load side of the second fuse and the intermediate node,
wherein in a phase-to-neutral configuration, the surge protector further comprises a phase-to-neutral terminal connection, and a surge suppressor connected between the intermediate node and a fifth terminal connection (P5), and wherein the first terminal connection (P1) is the first hot line, the second terminal connection (P2) is the first load line, the fourth terminal connection (P4) is a neutral line, and the fifth terminal connection (P5) is a ground line, and
wherein in a phase-to-phase configuration, the surge protector further comprises a phase-to-phase terminal connection connected to the intermediate node, and wherein the first terminal connection (P1) is the first hot line, the second terminal connection (P2) is the first load line, the third terminal connection (P3) is a second hot line, the fourth terminal connection (P4) is a second load line, and the sixth terminal connection (P6) is the ground line.

17. The surge protector of claim 16, further comprising an indicator circuit coupled at least between the second terminal connection and the fourth terminal connection and capable of indicating an operational status of the surge protector.

* * * * *